United States Patent
Hu et al.

(10) Patent No.: US 12,145,859 B2
(45) Date of Patent: *Nov. 19, 2024

(54) POSITIVE ELECTRODE MATERIAL AND PREPARATION METHOD THEREFOR, LITHIUM ION BATTERY AND VEHICLE

(71) Applicant: BYD COMPANY LIMITED, Guangdong (CN)

(72) Inventors: Dongjie Hu, Shenzhen (CN); Hao Wei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 819 days.

This patent is subject to a terminal disclaimer.

(21) Appl. No.: 17/259,100

(22) PCT Filed: Jul. 10, 2019

(86) PCT No.: PCT/CN2019/095353
§ 371 (c)(1),
(2) Date: Jan. 8, 2021

(87) PCT Pub. No.: WO2020/011179
PCT Pub. Date: Jan. 16, 2020

(65) Prior Publication Data
US 2021/0292185 A1  Sep. 23, 2021

(30) Foreign Application Priority Data
Jul. 10, 2018  (CN) .......................... 201810753629.1

(51) Int. Cl.
*H01M 4/131* (2010.01)
*C01G 53/00* (2006.01)
(Continued)

(52) U.S. Cl.
CPC ............ *C01G 53/56* (2013.01); *H01M 4/366* (2013.01); *H01M 4/38* (2013.01); *H01M 4/505* (2013.01);
(Continued)

(58) Field of Classification Search
CPC ........... H01M 4/366; H01M 2004/028; H01M 4/131; H01M 4/525; H01M 4/52; H01M 4/136; H01M 4/38
See application file for complete search history.

(56) References Cited

U.S. PATENT DOCUMENTS

| 6,368,749 B1 | 4/2002 | Yanai et al. |
| 2011/0089369 A1* | 4/2011 | Patoux .................. C01G 53/44 252/182.1 |

(Continued)

FOREIGN PATENT DOCUMENTS

| CN | 101891930 A | 11/2010 |
| CN | 102024932 A | 4/2011 |

(Continued)

OTHER PUBLICATIONS

English translation of KR 2013/0116585 (Year: 2013).*
(Continued)

*Primary Examiner* — Yoshitoshi Takeuchi (57) ABSTRACT

A cathode material, a preparation method thereof, a lithium ion battery and a vehicle are provided. The cathode material comprises cathode material particles comprising a central area, and a surface layer area, wherein the central area comprises lithium oxide, and the surface layer area comprises lithium oxide and elemental sulfur, in which the lithium oxide comprises $\delta LiNi_mCo_nX_{(1-m-n)}O_2 \cdot (1-\delta) Li_2MO_3$, where $0 \leq \delta \leq 1$, X comprises at least one selected from Mn, Al, Nb, and Fe, M comprises at least one selected from Mn, Al, Nb, Fe, Co, and Ni, $0 \leq m < 1$, and $0 \leq n < 1$.

18 Claims, 2 Drawing Sheets

(51) Int. Cl.
| | | |
|---|---|---|
| *H01M 4/136* | (2010.01) | |
| *H01M 4/36* | (2006.01) | |
| *H01M 4/38* | (2006.01) | |
| *H01M 4/505* | (2010.01) | |
| *H01M 4/52* | (2010.01) | |
| *H01M 4/525* | (2010.01) | |
| *H01M 10/0525* | (2010.01) | |
| *H01M 4/02* | (2006.01) | |

(52) U.S. Cl.
CPC ....... *H01M 4/525* (2013.01); *H01M 10/0525* (2013.01); *C01P 2004/61* (2013.01); *H01M 2004/021* (2013.01)

(56) References Cited

U.S. PATENT DOCUMENTS

| | | | |
|---|---|---|---|
| 2016/0049645 A1 | 2/2016 | Zheng et al. | |
| 2018/0175387 A1* | 6/2018 | Kim | H01M 4/134 |

FOREIGN PATENT DOCUMENTS

| | | | |
|---|---|---|---|
| CN | 102386389 A | 3/2012 | |
| CN | 102683659 A | 9/2012 | |
| CN | 102723470 A | 10/2012 | |
| CN | 103137960 A | 6/2013 | |
| CN | 103187563 A | 7/2013 | |
| CN | 103700860 A | 4/2014 | |
| CN | 103972464 A | 8/2014 | |
| CN | 104253275 A | 12/2014 | |
| CN | 204118182 U | 1/2015 | |
| CN | 105304908 A | 2/2016 | |
| CN | 105336915 A | 2/2016 | |
| CN | 105406059 A | 3/2016 | |
| CN | 105529446 A | 4/2016 | |
| CN | 106549157 A | 3/2017 | |
| CN | 107017387 A | 8/2017 | |
| CN | 107017388 A | 8/2017 | |
| CN | 107681114 A | 2/2018 | |
| CN | 107785537 A | 3/2018 | |
| KR | 2013/0116585 | * 10/2013 | .......... H01M 10/052 |

OTHER PUBLICATIONS

International Search Report and Written Opinion for Application No. PCT/CN2019/095353, mailed on Sep. 27, 2019, 8 pages.

Idemoto et al., "Characterization, average and electronic structures during charge-discharge cycle in 0.6Li2MnO3-0.4Li(Co1/3Ni1/3Mn1/3)O2 solid solution of a cathode active material for Li-ion battery", Journal of Power Sources, Oct. 2014, vol. 273, pp. 1023-1029.

Auvergniot et al., "Interface Stability of Argyrodite Li6PS5Cl toward LiCoO2, LiNi1/3Co1/3Mn1/3O2, and LiMn2O4 in Bulk All-Solid-State Batteries", Chemistry of Materials, American Chemical Society, 2017, vol. 29, pp. 3883-3890.

* cited by examiner

POSITIVE ELECTRODE MATERIAL AND PREPARATION METHOD THEREFOR, LITHIUM ION BATTERY AND VEHICLE

CROSS-REFERENCE TO RELATED APPLICATIONS

This application is a national phase application of International Patent Application No. PCT/CN2019/095353, filed with the China National Intellectual Property Administration (CNIPA) on Jul. 10, 2019, which is based on and claims priority to and benefit of Chinese Patent Application No. 201810753629.1 filed on Jul. 10, 2018 with the CNIPA. The content of all of the above applications is incorporated herein by reference in their entirety.

FIELD

This application relates to the field of materials and new energy, and in particular, to a cathode material, a preparation method thereof, a lithium ion battery, and a vehicle.

BACKGROUND

Among various kinds of new energy batteries, due to the high specific energy, high voltage, low self-discharge, good safety performance, and long cycle life, a lithium ion battery has attracted wide attention, and become successfully industrialized. The main components of lithium ion battery include an electrolyte, a separator material, and a cathode and an anode material. The cathode material of lithium ion battery occupies a large proportion in the battery, and the performance of the cathode material directly affects the battery performance, so the cathode material is the key to the development and performance improvement of the lithium ion battery.

The addition of sulfur element to the cathode material can increase the lithium binding capacity of the cathode material, thereby allowing the battery to have a high theoretical specific capacity of and a high overall energy density.

SUMMARY

In one aspect of this application, this application provides a cathode material. The cathode material comprises cathode material particles, wherein the cathode material particles comprising a central area, and a surface layer area, where the central area comprises lithium oxide, and the surface layer area comprises lithium oxide and elemental sulfur, wherein the lithium oxide comprises $\delta LiNi_m Co_n X_{(1-m-n)} O_2 \cdot (1-\delta) Li_2 MO_3$, $0 \leq \delta \leq 1$, X includes at least one of Mn, Al, Nb, and Fe, M includes at least one of Mn, Al, Nb, Fe, Co, and Ni, $0 \leq m < 1$, $0 \leq n < 1$, and $0 \leq m+n < 1$. The cathode material particle precursor has pores suitable for the filling of sulfur element, and the pores can prevent the polysulfide intermediate from dissolving in the electrolyte. The cathode material particle structure does not reduce the overall compaction density of the cathode material, which facilitates the increase of the volume energy density of the cathode material.

In another aspect of this application, this application provides a method for preparing a cathode material, wherein the cathode material comprising cathode material particles. The method comprises: mixing a solution containing metal ions, a complexing agent, and a precipitating agent in a stirring condition, and co-precipitating to obtain a core precursor, and mixing the core precursor with a lithium source and baking to obtain a cathode material particle precursor formed by packing lithium oxide nanoparticles, wherein the cathode material particle precursor comprising a central area and a surface layer area located outside the central area, where the metal includes at least one of Mn, Al, Nb, Fe, Co, and Ni, and the lithium oxide nanoparticles comprises $\delta LiNi_m Co_n X_{(1-m-n)} O_2 \cdot (1-\delta) Li_2 MO_3$, in which $0 \leq \delta \leq 1$, X includes at least one selected from Mn, Al, Nb, and Fe, M includes at least one selected from Mn, Al, Nb, Fe, Co, and Ni, $0 \leq m < 1$, $0 \leq n < 1$, and $0 \leq m+n < 1$; mixing the cathode material particle precursor with a sulfur source, melting and solidifying, to fill the elemental sulfur in the surface layer area and obtain the cathode material particles. The cathode material particle precursor obtained in the method has a microstructure suitable for the filling of sulfur element in the surface layer area. The filling of elemental sulfur in the surface layer area can prevent sulfur from dissolving in the electrolyte. The particle structure of the cathode material does not reduce the overall compaction density of the cathode material, which is beneficial to increasing the volume energy density of the cathode material.

In another aspect of this application, this application provides a lithium ion battery. The lithium ion battery includes the foregoing cathode material or the cathode material prepared by the foregoing method. Therefore, the lithium ion battery has a higher energy density and a better cycle life.

In another aspect of this application, this application provides a vehicle. The vehicle includes a lithium ion battery as described above. Therefore, the vehicle has all the features and advantages of the lithium ion battery described above, which will not be repeated here.

DETAILED DESCRIPTION

Embodiments of this application are described in detail below, and examples of the embodiments are shown in the accompanying drawings, where the same or similar elements and the elements having same or similar functions are denoted by the same or similar reference numerals throughout the descriptions. The embodiments described below with reference to the accompanying drawings are exemplary and used for explaining the present application, and should not be construed as a limitation on the present application.

The endpoints and any values of the ranges disclosed herein are not limited to the precise range or value, and these ranges or values should be understood to include values close to these ranges or values. A numerical range between endpoint values of each range, a numerical range between an endpoint value and an individual point value of each range, and a numerical range between individual point values may be combined with each other to obtain one or more new numerical ranges, and such numerical ranges should be considered to be specifically disclosed herein.

This application is accomplished on the basis of the inventor's discovery and insight into the fact that:

Due to the electronic inertness of sulfur and the easy dissolution in an organic solvent of a sulfur intermediate during lithium intercalation, the cathode material containing sulfide ions suffers a greater limitation in practical applications. Although the above problem can be alleviated to a certain extent by compounding carbon as a carrier into the cathode material, simply relying on elemental carbon to segregate the electrolyte to prevent sulfur from dissolving in the electrolyte will not only increase the production cost of the cathode material, extend production process, and reduce the production efficiency, but also make it difficult to fundamentally solve the above-mentioned problem of sulfur-based cathode materials. After in-depth researches, the present inventors find that in sulfur-based cathode materials, the problem of easy dissolution of sulfur in the electrolyte is largely caused by the structure of the cathode active material that is not suitable for the filling of sulfur atoms.

In one aspect of this application, this application provides a sulfur-containing cathode material. The cathode material comprises cathode material particles comprising a central area, and a surface layer area. The central area comprises lithium oxide and the surface layer comprises lithium oxide and elemental sulfur. In the cathode material particle precursor, the microstructure (i.e., pores) of the surface layer area is suitable for the filling of sulfur element. The cathode material obtained by filling elemental sulfur in the pores in the surface layer area can effectively prevent sulfur from dissolving in the electrolyte. The particle structure of the cathode material does not reduce the overall compaction density of the material, thereby contributing to the increase in the volume energy density of the cathode material.

Hereinafter, the cathode material will be explained in detail by way of specific embodiments of the present application:

According to an embodiment of the present application, the specific chemical composition of the lithium oxide is not particularly limited, and can be selected by those skilled in the art according to actual situations. For example, according to some embodiments of the present application, the lithium oxide may be composed of ternary materials. Specifically, the chemical formula of lithium oxide is $\delta LiNi_m Co_n X_{(1-m-n)} O_2 \cdot (1-\delta) Li_2 MO_3$, where $0 \leq \delta \leq 1$, X includes at least one selected from Mn, Al, Nb, and Fe, M includes at least one selected from Mn, Al, Nb, Fc, Co, and Ni, $0 \leq m < 1$, $0 \leq n < 1$, and $0 \leq m+n < 1$. More specifically, the average valency of M in $Li_2 MO_3$ can be +4. The average valency of X in $LiNi_m Co_n X_{(1-m-n)} O_2$ can be between +3 and +4. A cathode material particle precursor structure with pores in the surface layer area can be obtained with the lithium oxide that meets the above chemical composition by simply controlling the synthesis process, where the pores in the surface layer area are suitable for the filling of elemental sulfur.

According to a specific embodiment of the present application, the ternary material may include a nickel cobalt manganese (NCM) ternary material, a nickel cobalt aluminum (NCA) ternary material, or a lithium-rich material. For example, the material can include $LiNi_{1-x-y} Co_x Mn_y O_2$, in which Mn may be replaced by any one of Al, Nb, and Fe, or 2, 3, or 4 of Mn, Al, Nb, and Fe are contained. When more than one element of Mn, Al, Nb, and Fe is contained, the total atomic content of the more than one element of Mn, Al, Nb, and Fe in the ternary material meets (1−m−n) in $LiNi_m Co_n X_{(1-m-n)} O_2$.

According to an embodiment of the present application, the cathode material particle precursor may be formed by packing lithium oxide nanoparticles. The lithium oxide nanoparticles may have a chemical composition that is the same as the above-mentioned lithium oxide. The thickness of the surface layer area of the cathode material is 0.5-20 μm, for example 5 μm, 10 μm, and 15 μm, etc., and the average particle size of the cathode material particles is 5-50 μm, for example, 5 μm, 10 μm, 15 μm, 20 μm, 25 μm, 30 μm, 35 μm, 40 μm, 45 μm, and 50 μm, etc. It should be noted that in this application, the "surface layer area" refers to an area with a thickness in the range of 0.5-20 μm along the radial direction of the cathode material particles, with the surface of the cathode material particles as the 0 point of the thickness. The area other than the surface layer area in the cathode material particles is the central area. The definitions for the surface layer area and central area are also applicable to cathode material particle precursor.

According to an embodiment of the present application, the cathode material particle precursor may be formed by packing the lithium oxide nanoparticles, and the surface layer area has pore structures. In a later stage, elemental sulfur is filled in the pores in the surface layer area of the cathode material particle precursor to obtain cathode material particles. Elemental sulfur is formed in the surface layer area. The main structure in the central area is still composed of lithium oxide, so the overall mechanical strength of the particles can be ensured, and no mass particle collapse and break up occur during the subsequent compaction process in the preparation of the battery. The depth of sulfur penetration can be achieved by controlling the thickness of the surface layer area.

According to the present disclosure, the lithium oxide nanoparticles are one or more selected from rod-shaped lithium oxide and bulk lithium oxide. The lithium oxide nanoparticles are packed to form the cathode material particle precursor having pores in the surface layer area. The length of the lithium oxide nanoparticles may be 0.5-2 μm, the width is 200-500 nm, and the aspect ratio is 2-40. Due to the large aspect ratio of lithium oxide nanoparticles, the pores formed by packing has a small diameter and has a certain depth. The size of the pores can be 50-1000 nm, such as 500 nm. Elemental sulfur is filled in the pores, and the electrolyte is effectively prevented from entering the pores to dissolve the filled sulfur. For the cathode material particles formed after elemental sulfur is filled in the cathode material particle precursor, the elemental sulfur filled in the surface layer area can completely fill the pores in the surface layer area, or partially fill the pores in the surface layer area. That is, besides the area filled by elemental sulfur, the surface layer area of the cathode material particles may still have some pore structures. The pore size in the surface layer area of the cathode material particle is similar to the pore size in the cathode material particle precursor (before the elemental sulfur is filled).

The present inventors find that by adjusting the morphology of the lithium oxide nanoparticles and the cathode material particle precursor formed by packing therewith, for example, the size of the lithium oxide nanoparticles, the gaps among the lithium oxide nanoparticles, the particle size of the cathode material particle precursor, and others, the sulfur atoms are allowed to better fill the pores in the surface layer area, so as to obtain a considerable filling ratio and filling stability, thereby increasing the specific capacity of the cathode material. In addition, by adjusting the size of the pores in the surface layer area, the dissolution of sulfur atoms in the cathode material by the electrolyte can be effectively reduced, so that good cycle stability is obtained, and the battery using the cathode material can achieve a long excellent calendar life. The calendar life can be the time required for the battery to reach the end of life in an open circuit state at a certain reference temperature, that is, the life of the battery in a standby state. The particles with the above morphology can also increase the overall energy density of the cathode material without reducing the overall compaction density of the material, which is beneficial to increasing the volume energy density of the cathode material. When the cathode material is used in a lithium ion battery, a considerable battery performance can be obtained. It should be particularly noted that in this application, the term "lithium oxide nanoparticles", or "primary particles", specifically means that the size in any dimension such as length, diameter, and width is at the nanometer level.

The present inventors find that compared with the flake-shaped or granular lithium oxide nanoparticles, after the rod-shaped or bulk lithium oxide nanoparticles with the above-mentioned size are packed to form the cathode material particle precursor, the surface layer is allowed to have relatively regular pores suitable for accommodating elemental sulfur. The shape of the cathode material particle precursor formed by packing of lithium oxide nanoparticles is not particularly limited, for example, one of spherical, rhombic, and ellipsoidal shapes.

According to some embodiments of the present application, the content of elemental sulfur can be 5-50 wt %, and the content of lithium oxide can be 50-95 wt %, based on the total weight of the cathode material. According to a specific embodiment of the present application, the sulfur content can be determined according to the pores in the surface layer area. The present inventors find that if the loading of elemental sulfur is too high, the excess sulfur failed to be filled in the pores will nucleate alone, resulting in an increase in the impedance of the material, a tendency to dissolve in the electrolyte, and severe electrochemical degradation. According to a specific embodiment of the present application, when the content of elemental sulfur is within the above range, elemental sulfur can be prevented from nucleation alone. For example, the content of elemental sulfur may be 10-30 wt %. Elemental sulfur can be melted and then penetrates into the pores. Unlike ordinary physical mixing, in case that the elemental sulfur is melted and penetrates into the pores, the presence of sulfur can also be detected inside the lithium oxide particles.

According to some embodiments of this application, to improve the performance of the cathode material, a coating can be formed on the outer surface of the cathode material particles. According to a specific embodiment of this application, the material of the coating may include any one or more of a carbon material, tin dioxide, manganese dioxide, titanium dioxide, tricobalttetraoxide, vanadium pentoxide, iron disulfide, copper disulfide, cobalt disulfide or bismuth trisulfide.

According to a specific embodiment of this application, the content of the coating is 0.1 to 10 wt %, based on the total weight of the cathode material.

According to a specific embodiment of the present application, a carbon coating is used, and the carbon coating is formed on the outer surface of the sulfur-filled lithium oxide particles. Therefore, the performance of the cathode material is improved. The specific thickness, material, morphology, and synthesis method of the carbon coating are not particularly limited, and familiar materials and methods can be used by those skilled in the art according to actual situations to form the carbon coating. Accordingly, the electrolyte can be blocked from entering the pores of the lithium oxide particles, to reduce the dissolution of elemental sulfur in the electrolyte.

According to a specific embodiment of this application, the coating is a titanium dioxide coating. The weight ratio of lithium oxide, sulfur, and titanium dioxide in the cathode material can be (90-45):(5-50):(2-8). For example, specifically, the coating amount of titanium dioxide accounts for 5 wt %.

Figure 1:
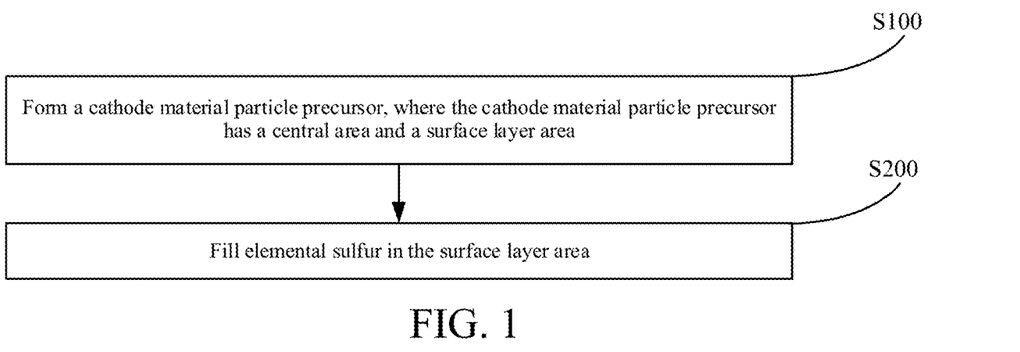
FIG. 1 is a process flow chart of a preparation method according to an embodiment of the present application.

In another aspect of this application, this application provides a method for preparing a cathode material comprising cathode material particles. The cathode material can have all the features and advantages of the above-described cathode material. Specifically, referring to FIG. 1, the method includes:

S100: Form a cathode material particle precursor, where the cathode material particle precursor has a central area and a surface layer area.

According to an embodiment of the present application, in this step, a cathode material particle precursor is formed. As described above, the cathode material particle precursor can be formed by packing lithium oxide nanoparticles. The lithium oxide nanoparticles are rod-shaped or bulk lithium oxide nanoparticles, and the surface layer area of the formed cathode material particle precursor has pores suitable for the filling of elemental sulfur. The microstructure of the cathode material particle precursor is suitable for the filling of sulfur element, and the pores in the surface layer area are small, which can prevent sulfur from dissolving in the electrolyte. The finally obtained cathode material particle structure does not reduce the overall compaction density of the material, which facilitates the increase of the volume energy density of the cathode material.

Figure 2:
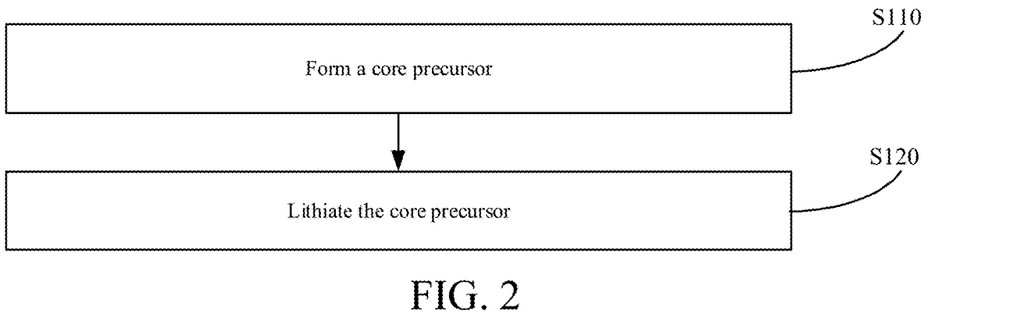
FIG. 2 is a partial process flow chart of a preparation method according to an embodiment of the present application.

According to some embodiments of the present application, referring to FIG. 2, the cathode material particle precursor can be obtained through the following steps:

S110: Form a core precursor

According to an embodiment of the present application, in this step, a solution containing metal ions, a complexing agent, and a precipitating agent are mixed with stirring to obtain a precursor solution. After co-precipitation, a core precursor is obtained. The precipitating agent, complexing agent and metal-containing solution are gradually added to the reactor.

As mentioned above, the core precursor formed by packing lithium oxide nanoparticles (where the subsequent lithiation process with the lithium source will not significantly affect the microstructures of the particles) has pores that are more suitable for the filling of sulfur. Therefore, in this step, the morphology of the core precursor can be controlled by adjusting the stirring speed, the temperature, the pH, and the concentration of the complexing agent. Specifically, the gradually added precipitating agent and other solutions can provide a shear force during the formation of the core precursor, and the lithium oxide nanoparticles gradually grow and are packed to form the core precursor. By comprehensively controlling the stirring speed, the reaction temperature, the reaction pH, and the concentration of the complexing agent, the size of and pores in the nano-core precursor formed can be controlled, to control the size of pores in the surface layer area of final cathode material particle precursor. Specifically, the above conditions are controlled so that the lithium oxide nanoparticles obtained by lithiation have a length of 0.5-2 μm, a width of 200-500 nm, and an aspect ratio of the lithium oxide nanoparticles of 2-40. The lithium oxide nanoparticles with a size in the above range can be packed to form a cathode material particle precursor with a surface layer area that has pores suitable for the filling of elemental sulfur. According to some embodiments of the present application, by controlling the above conditions, the size of pores in the surface layer area of the cathode material particle precursor is 50-1000 nm, such as 500 nm. As a result, not only lithium oxide nanoparticles with a specific morphology (for example, a rod shape) can be obtained, and the packed cathode material particle precursor can also have a relatively uniform pore distribution and a relatively ideal morphology.

According to an embodiment of the present application, the solution containing metal ions can be provided by an inorganic salt solution containing the metal element. The metal element includes at least one of Mn, Al, Nb, Fe, Co, and Ni, and the metal salt solution is added to the reactor with stirring. The above process can be carried out with heating, for example, at 30° C.-60° C., such as 40° C., 45° C., 50° C., or 55° C. Specifically, the reactor can be placed in a water bath at 40-60° C. The metal salt solution may include a solution for forming an NCM or NCA material (without Li), and may be at least one of a nickel-containing salt solution, a cobalt-containing salt solution, and a manganese-containing salt solution, for example, a nitrate solution containing the above-mentioned metal ions. The complexing agent used in the preparation process can form a stable complex with the metal ions to further control the rate of precipitation. The commonly used complexing agent includes an alkaline solution, such as aqueous ammonia. The concentration of aqueous ammonia can be 5-15 wt %. The specific chemical composition of the metal salt solution can be determined according to the content of metal elements in the lithium oxide to be formed. The chemical composition of the cathode material particle precursor has been described in detail above, and will not be repeated here again.

According to an embodiment of the present application, the metal salt solution and the complexing agent are added to the reactor at a fixed ratio with stirring. The fixed ratio and the metal-containing solution are determined according to the chemical composition of lithium oxide. The total amount of the metal-containing solution in the mixed solution and the chemical composition of the metal can both be determined according to the chemical composition of the lithium oxide to be synthesized. The present inventors find that the stirring speed has a vital impact on the size of the nano-lithium oxide precursor particles formed and the morphology of the core precursor, which affects the morphology of the final cathode material particles. When the stirring speed is 300-1000 rpm/min, nanoparticles as described above can be obtained. Specifically, the stirring speed can be 600-800 rpm/min.

According to an embodiment of the present application, the precipitating agent may be a reagent that can precipitate metal ions, for example, an aqueous solution of a hydroxide, such as potassium hydroxide, sodium hydroxide, and the like. The precipitating agent can be pumped into the reactor containing the mixed solution by a variable speed transmitter. The pumping speed of the precipitating agent can be determined based on the pH value of the reaction system (i.e., the precursor solution). The pH value is controlled at a fixed value during the reaction, or fixed at a fixed value in the initial, middle and late stages of the reaction. During the reaction process, with the co-precipitation with hydroxide, the hydroxide ions in the system are consumed, and the pH value of the system decreases. Therefore, a precipitating agent needs to be added to ensure the pH value of the precursor solution. When the pH value rises to a set value, the addition of precipitating agent is stopped. Generally, the pH value is kept unchanged during the entire reaction, that is, the pumping speed of the precipitating agent does not change, and the ratio of the added precipitating agent to the metal salt solution is about 2:1. Alternatively, according to other embodiments of the present application, it is also possible to control the pH at a low value in the early stage of the reaction, and then to increase the pH value subsequently.

Similarly, the precipitating agent can also be added at a temperature of 30° C.-60° C., for example, 40° C. The amount of the precipitating agent added can be determined by those skilled in the art according to the specific chemical composition of the lithium oxide, the total amount of the mixed solution, and the ratio of the complexing agent and the metal salt solution in the mixed solution. According to a specific embodiment of the present application, the pH of the obtained precursor solution can be controlled to 10-12, for example 11, by the amount of the precipitating agent added The precursor solution obtained after the above operation is allowed to stand at 45° C.-60° C. for 15-30 hours to cause a co-precipitation reaction. Thus, the core precursor is easily obtained.

S120: Lithiate the core precursor

According to an embodiment of the present application, in this step, the previously obtained core precursor and a lithium source are mixed and baked to lithiate the core precursor, thereby obtaining a cathode material particle precursor including a central area, and a surface layer area located outside the central area.

According to an embodiment of the present application, in this step, an appropriate lithium-containing reagent can be used by those skilled in the art according to actual needs. For example, according to a specific embodiment of the present application, an inorganic salt of lithium, such as nitrate, may be used. The mixing ratio of the core precursor and the lithium source can be determined according to the chemical composition of the lithium oxide. The baking treatment may be performed at a baking temperature of 600° C.-800° C.

According to some embodiments of the present application, the lithiation of the core precursor may be mixing the previously obtained core precursor with a lithium salt (i.e., the lithium source) in water. After standing for a period of time, the precipitate is separated and dried by separation methods such as filtration, drying, and evaporation. The dried precipitate is baked at the above-mentioned baking temperature for a baking time that can be 10-18 hours, such as 12 hours.

In order to improve the quality of the obtained cathode material particle precursor, a better crystal form (such as ternary crystal form) of lithium oxide is formed, while maintaining the pores in the previously formed core precursor. An annealing step is included after the baking. In addition, the baking process may include rapidly raising the temperature to the baking temperature, maintaining at the temperature for a short time, and then annealing. The process specifically includes:

raising the temperature quickly to the roasting temperature in a relatively short period of time, such as 15 min to 1 hr, maintaining at the temperature for 0.5-2 hours, and then quickly cooling to room temperature. During the rapid cooling, the sample can be directly placed in an environment at the room temperature (where the temperature can be 0-40° C.). The cooling time for rapid cooling can be 20 min to 1 hr, the annealing temperature can be 450 to 700° C., such as 500° C., and the annealing time can be 3-8 hours, such as 5 hours.

S200: Fill elemental sulfur in the surface layer area

According to an embodiment of the present application, in this step, the elemental sulfur is filled in the pores in the surface layer area of the cathode material particle precursor to form an elemental sulfur-containing cathode material particles. According to a specific embodiment of the present application, this step can be implemented by mixing the previously prepared cathode active material particle precursor with a sulfur source, followed by a melting and solidification treatment. Elemental sulfur can be melted and then penetrates into the pores. Unlike ordinary physical mixing, in case that the elemental sulfur is melted and penetrates into the pores, the presence of sulfur can also be detected inside the lithium oxide particles. This cannot be achieved by simple physical mixing. After simple physical mixing, the adhesion of sulfur to the cathode material particles is poor, and electrical contact tends to be lost subsequently, resulting in electrochemical failure. Sulfur is also easier to dissolve in the electrolyte, causing serious shuttle effect. The shuttle effect refers to a fact that during the charge and discharge process, a polysulfide ($Li_2S_x$) intermediate produced in the cathode is dissolved in the electrolyte, passes through the separator, diffuses to the anode, and directly reacts with the metal lithium in the anode, which ultimately causes the irreversible loss of effective materials in the battery, reduced battery life, and low coulombic efficiency.

According to an embodiment of the present application, the cathode material particle precursor and the sulfur source can be mixed at a weight ratio of (8-12):(0.5-2). For example, the mixing ratio can be 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1 and the like. The sulfur source may be elemental sulfur. The temperature for the melting and solidification treatment can be 120-180° C., such as 130, 140, 150, 160, or 170° C., and the treatment time can be 10-15 hours, such as 11, 12, 13, or 14 hours. Specifically, the treatment can take place at 150° C. for 12 hours. Therefore, sulfur can be easily filled into the pores of lithium oxide particles formed.

According to an embodiment of the present application, the melting and solidification treatment may occur under an inert atmosphere. Alternatively, the treatment can take place in a sealed and pressurized container under an inert atmosphere such as nitrogen or argon, where the pressure in the container can be 5-12 MPa, for example, 8 MPa. For example, according to a specific embodiment of the present application, the lithium oxide particles and the sulfur source are mixed and placed in a sealed container, and then an inert gas is filled into the container for pressurization. The pressure after pressurization may be 10 MPa, or 8 MPa.

Figure 3:
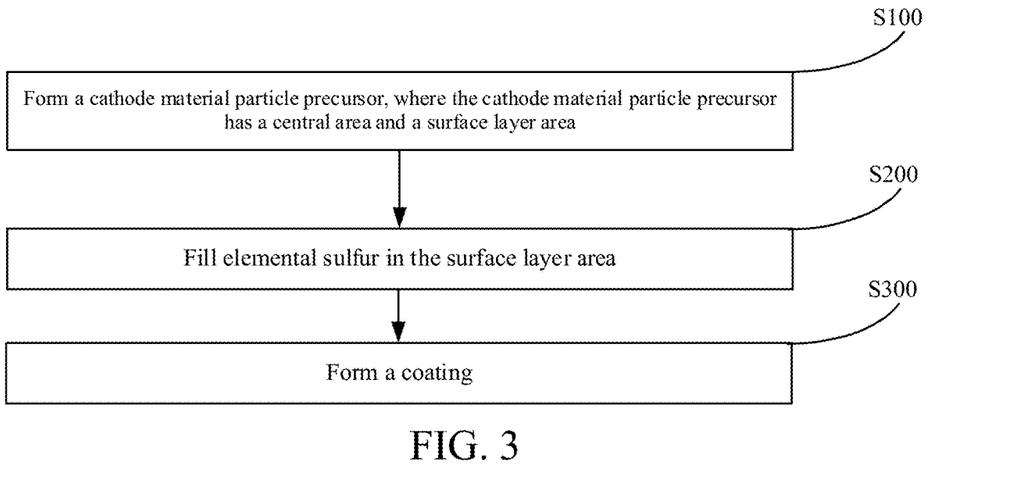
FIG. 3 is a process flow chart of a preparation method according to an embodiment of the present application.

According to an embodiment of this application, to improve the performance of the cathode material prepared by the above method, referring to FIG. 3, the method may further include, after the melting and solidification treatment, S300: Form a coating According to an embodiment of the present application, in this step, a coating is formed outside the cathode material particle. For the specific method for forming the coating and the chemical composition of the coating, choices can be made by those skilled in the art according to the actual situations. For example, the material of the coating can be any one or more selected from carbon materials, tin dioxide, manganese dioxide, titanium dioxide, tricobalttetraoxide, vanadium pentoxide, iron disulfide, copper disulfide, cobalt disulfide or bismuth trisulfide. The carbon material can be graphite, Ketjen black, graphene, carbon nanotubes, and activated carbon, etc. Methods for forming the coating include, but are not limited to, spray drying, hydrothermal methods, and others. As a result, the elemental sulfur can be further separated from the electrolyte, thereby improving the cycle performance and stability of the battery using the cathode material.

In another aspect of this application, this application provides a cathode material. According to an embodiment of the present application, the cathode material is prepared by the method as described above. Therefore, the cathode material has all the features and advantages of the cathode material obtained by the aforementioned method, and will not be repeated here again.

In another aspect of this application, this application provides a lithium ion battery. The lithium ion battery includes the cathode material as described above. Therefore, the lithium ion battery has all the features and advantages of the cathode material as described above, and will not be repeated here again. In general, the lithium ion battery has a higher energy density and a better cycle life.

In another aspect of this application, this application provides a vehicle. According to an embodiment of the present application, the vehicle includes a lithium ion battery as described above. For example, the vehicle may include a plurality of battery packs composed of the aforementioned lithium ion batteries. Therefore, the vehicle has all the features and advantages of the lithium ion battery as described above, and will not be repeated here again.

The following describes the present application through specific examples. It should be noted that the following specific examples are for the purpose of description only, and are not intended to limit the present application in any manner. In addition, unless otherwise specified, methods without specific conditions or steps are conventional methods, and the reagents and materials used are commercially available.

For the raw materials used below, nickel nitrate, cobalt nitrate, lithium nitrate, aqueous ammonia, and lithium nitrate are purchased from Shenzhen Bolaien Science and Technology Co., Ltd., and elemental sulfur is purchased from Aladdin.

Example 1: Production of Cathode Material (1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was added at a constant rate within 10 min, where the aqueous ammonia was pumped in at the same rate as that of the salt solution. Sodium hydroxide was added to adjust the pH to 11. Co-precipitation was carried out at 30° C. for 24 hours, and a core precursor was obtained by filtration.

(2) The core precursor obtained in Step 1) and lithium nitrate were mixed in water at a molar ratio of 1 to 1.2 to obtain a precipitate, and the precipitate was separated by filtration and dried, and then baked at 700° C. for 10 hours. A ternary cathode material particle precursor was obtained.

(3) The ternary cathode material particle precursor was mixed with elemental sulfur at a weight ratio of 10:1, then thermally treated in a muffle furnace, reacted at 150° C. for 12 hours. removed, dried and pulverized to obtain sulfur-compounded ternary cathode material particles.

Example 2: Production of Cathode Material (1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was added at a constant rate within 10 min, where the aqueous ammonia was pumped in at the same rate as that of the salt solution. Sodium hydroxide was added to adjust the pH to 11. Co-precipitation was carried out at 30° C. for 24 hours, and a core precursor was obtained by filtration.
(2) The core precursor obtained in Step 1) and lithium nitrate were mixed in water at a molar ratio of 1-1.2 to obtain a precipitate. The precipitate was separated by filtration, removed, dried, and baked at 700° C. for 10 hours. A ternary cathode material particle precursor was obtained.
(3) Ternary cathode material particle precursor and elemental sulfur were mixed at a weight ratio of 10:0.5, and then reacted in a hydrothermal reactor at a temperature of 150° C. for 12 hours.

Example 3: Production of Cathode Material (1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was added at a constant rate within 10 min, where the aqueous ammonia was pumped in at the same rate as that of the salt solution. Sodium hydroxide was added to adjust the pH to 11. Co-precipitation was carried out at 30° C. for 24 hours, and a core precursor was obtained by filtration.
(2) The core precursor and lithium nitrate were mixed in water at a molar ratio of 1 to 1.2 to obtain a precipitate, which was then removed and dried. The precipitate was heated to 700° C. within 40 min, and then baked at 700° C. for 1 hr, removed, cooled to room temperature within 30 min, and then annealed at 500° C. for 5 hours. A ternary cathode material particle precursor was obtained.
(3) The ternary cathode material particle precursor and elemental sulfur were mixed at a weight ratio of 8:1, and then reacted in a hydrothermal reactor at a temperature of 150° C. for 12 hours.

Example 4: Production of Cathode Material (1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was slowly added at a constant rate, and sodium hydroxide was added to adjust the solution to pH 11. Co-precipitation was carried out at 30° C. for 24 hours, and a core precursor was obtained by filtration.
(2) The core precursor was mixed with lithium nitrate in water at a molar ratio of 1 to 1.2, removed, dried, and then baked at 700° C. for 1 hr. The obtained material was removed while it was at 700° C., rapidly cooled to room temperature (where the room temperature is the normal room temperature, and may be 10-35° C., for example, 25° C.), and then annealed at 500° C. for 5 hours. A ternary cathode material particle precursor was obtained.
(3) The ternary cathode material particle precursor and elemental sulfur were mixed at a weight ratio of 14:1, fed to a hydrothermal reactor, pressurized by introducing inert argon, sealed, and reacted for 12 hours at 150° C. under a pressure of 10 MPa. The obtained material was removed, dried and pulverized to obtain sulfur-compounded ternary cathode material particles.

Example 5

(1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was added at a constant rate within 10 min, where the aqueous ammonia was pumped in at the same rate as that of the salt solution. Sodium hydroxide was added to adjust the pH to 11. Co-precipitation was carried out at 30° C. for 24 hours, and a core precursor was obtained by filtration.
(2) The core precursor obtained in Step (1) and lithium nitrate were mixed in water at a molar ratio of 1 to 1.2 to obtain a precipitate, and the precipitate was separated by filtration and dried, and then baked at 700° C. for 10 hours. A ternary cathode material particle precursor was obtained.
(3) Ternary cathode material particle precursor and elemental sulfur were mixed at a weight ratio of 10:2, and then reacted in a hydrothermal reactor at a temperature of 150° C. for 12 hours, to obtain ternary cathode material particles.
(4) The ternary cathode material obtained in Step (3) was dispersed in n-butanol by heating at 40° C. with stirring. Isopropyl titanate was quantitative added (determined according to a coating amount of titanium dioxide of 5 wt %), and continuously stirred to obtain the final product, which was washed and dried to obtain sulfur-compounded ternary cathode material particles coated with titanium dioxide.

Example 6

(1) 50 mmol of nickel nitrate and 50 mmol of cobalt nitrate were dissolved in 100 g of water to form a salt solution. The salt solution was pumped into a hydrothermal reactor with stirring (at a stirring speed 500 rpm). Then, 5 g of aqueous ammonia (having a concentration of 10 wt %) was added at a constant rate within 10 min, where the aqueous ammonia was pumped in at the same rate as that of the salt solution. Sodium hydroxide was added to adjust the pH to 11.

Co-precipitation was carried out at 30° C. for 24 hours, and a core precursor was obtained by filtration.

(2) The core precursor obtained in Step 1) and lithium nitrate were mixed in water at a molar ratio of 1-1.2 to obtain a precipitate. The precipitate was separated by filtration, removed, dried, and baked at 700° C. for 10 hours. A ternary cathode material particle precursor was obtained.

(3) The ternary cathode material particle precursor and elemental sulfur were mixed at a weight ratio of 12:1, and then reacted in a hydrothermal reactor at a temperature of 150° C. for 12 hours, to obtain ternary cathode material particles.

(4) The graphite powder and the ternary cathode material particles obtained in Step (3) were mixed at a molar ratio of 1 to 1.2, and spray-dried to form a carbon coating on the surface of the sulfur-compounded ternary cathode material particles filled with elemental sulfur.

Comparative Example 1

A ternary cathode material particle precursor was prepared following the method as described in Example 1, and then the obtained ternary cathode material particle precursor was directly mixed with elemental sulfur at a weight ratio of 10:1 to obtain sulfur-compounded ternary cathode material particles.

Comparative Example 2

(1) The core precursor was prepared as described in Step (1) in the examples.

(2) The core precursor was mixed with lithium nitrate in water at a molar ratio of 1 to 1.2 to obtain a precipitate. The precipitate was separated by filtration, dried, and then baked at 700° C. for 1 hr. The obtained material was removed while it was at 700° C., rapidly cooled to room temperature (where the room temperature is the normal room temperature, and may be 10-35° C., for example, 25° C.), and then annealed at 500° C. for 5 hours. A ternary cathode material particle precursor was obtained.

(3) The ternary cathode material particle precursor and elemental sulfur were directly mixed at a molar ratio of 1 to 1.2.

Performance Test
1. Characterization of Morphology

The morphologies of the samples 1 obtained in the above examples and the intermediates during the preparation process were observed under a scanning electron microscope (SEM).

Figure 4:
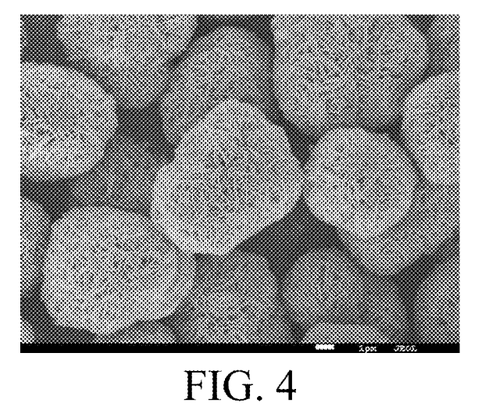
FIG. 4 shows a scanning electron microscopy (SEM) image of a non-lithiated core precursor prepared in an embodiment of the present application.

Referring to FIG. 4, the core precursor (non-lithiated) obtained in Example 1 is spherical particles with a diameter of about 5 to 8 μm, which is packed with rod-shaped particles with a diameter of about 100 nm. The length of the rod-shaped particles varies from 0.5 to 5 μm, and the pores in the packed spherical particles are about 500 nm to 1 μm.

Figure 5:
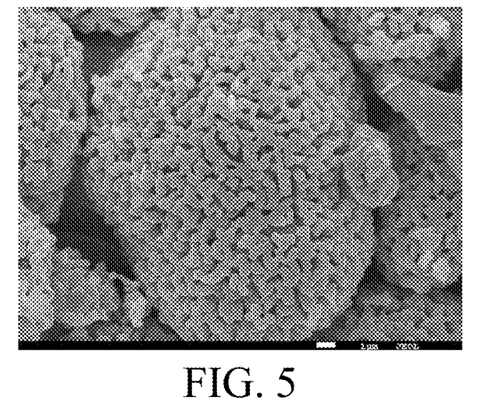
FIG. 5 shows a scanning electron microscopy (SEM) image of a lithiated cathode material particle precursor prepared in an embodiment of the present application.

The morphology of the ternary active material obtained in Example 1 is shown in FIG. 5. After lithiation, the pore size of the spherical particles is further optimized. It can be seen from comparison with FIG. 4 that the pore size distribution of the lithiated spherical particles is more uniform, which is beneficial to the filling of elemental sulfur.

Figure 6:
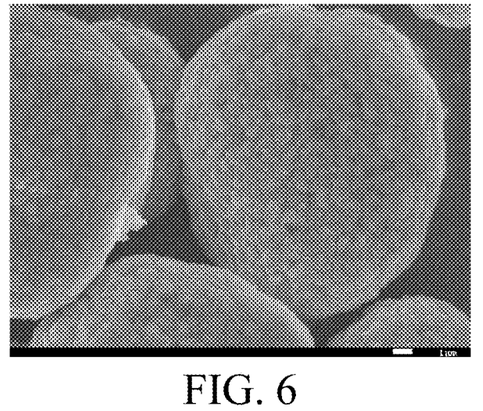
FIG. 6 shows an SEM image of a cathode material prepared in an embodiment of the present application.

The morphology of the cathode material filled with elemental sulfur obtained in Example 1 is shown in FIG. 6. It can be seen that elemental sulfur can be uniformly filled into the pores of the lithium oxide particles in a considerable amount. The test results are shown in Table 1.

2. Sulfur Content Test

Sulfur content in samples obtained from the above examples and comparative examples were tested. The test method and steps were specifically as follows: The overall sulfur content in the material was tested by a carbon-sulfur analyzer. The test results are shown in Table 1.

TABLE 1

Test results of samples

| Sample | Example 1 | Example 2 | Example 3 | Example 4 | Example 5 | Example 6 | Comparative Example 1 | Comparative Example 2 |
|---|---|---|---|---|---|---|---|---|
| Sulfur content | 2% | 4.7% | 11% | 6% | 16.5% | 7.6% | 9.1% | 9.1% |
| Particle size | 5-10 μm | 6-20 μm | 15-25 μm | 8-17 μm | 7-20 μm | 4-17 μm | 10-20 μm | 5-15 μm |
| Thickness of surface layer area | 0.5-3 μm | 1-5 μm | 2-10 μm | 1-5 μm | 2-10 μm | 1-4 μm | Without surface layer area | Without surface layer area |

It can be seen from the test results that the materials obtainable in the examples and comparative examples all have considerable sulfur content. In addition, because the elemental sulfur and ternary cathode material are directly mixed without heat treatment in the two comparative examples, a higher sulfur content test result is shown when the sulfur content is tested directly.

3. Volume Energy Density Test

Specific test method: 5 g of the cathode materials obtained in the above examples and comparative examples were taken respectively, mixed with the cathode conductive agent carbon black and the cathode binder PVDF at a weight ratio of 94:3:3, fed to a mold with a diameter of 2 cm, and pressed under a pressure of 10 Mpa to obtain a powder. The volume energy density of the cathode active material was calculated as follows.

The highest height that the powder can be pressed under the above pressure is h, and the compaction density of the powder is $\rho = 5/\pi r^2 h$.

The energy density is calculated by a formula below:

Energy density=specific capacity*average charging voltage*compaction density of the powder.

Specific capacity=capacity/weight of active material

Average charging voltage=charging current*charging time/total charging capacity

The test results are shown in Table 2:

TABLE 2

Test results of energy density of samples

| Sample (cathode material) | Example 1 | Example 2 | Example 3 | Example 4 | Example 5 | Example 6 | Comparative Example 1 | Comparative Example 2 |
|---|---|---|---|---|---|---|---|---|
| Energy density/ (wh/L) | 2513 | 2824 | 3034 | 2603 | 3027 | 2865 | 1905 | 2078 |

It can be seen from the test results that although the samples obtained in Comparative Example 1 and Comparative Example 2 have higher sulfur content in the sulfur content test, their energy density is significantly lower than that of the samples obtained in the examples. This is because the sample is a cathode material during the sulfur content test. Therefore, in the samples from the comparative examples formed by direct mixing, some of the sulfur element is adsorbed on the surface of the ternary material by physical adsorption. However, after the cathode material undergoes the above processes of preparing the battery (such as coating, drying, and soot blowing, etc.), a part of the physically adsorbed elemental sulfur will be lost, but the heat-treated samples from Example 1-Example 6 will not suffer from the loss as does in the comparative examples. In addition, after the cathode sample is in contact with the electrolyte, the cathode materials prepared in Comparative Example 1 and Comparative Example 2 fail to have the morphology of the particles in Example 1 to Example 6, so the dissolution of elemental sulfur loaded therein after contact with the electrolyte cannot be alleviated. In Comparative Example 1, the core precursor is synthesized without stirring, so the morphology of the core precursor cannot be well controlled; and only a simple one-step heat treatment is performed during the lithiation of the core precursor, so the morphology of the core precursor cannot be well retained. Therefore, the finally obtained cathode material particles do not have the surface layer area. In Comparative Example 2, although rapidly cooling and annealing are performed in the lithiation process and the ternary cathode material particles retain a certain morphology (with pore structures in an outer area having a thickness ranging from 1 to 5 microns), elemental sulfur is only attached to the surface, so the surface layer of the final cathode material comprises exclusively sulfur and the dissolution of elemental sulfur cannot be prevented. Moreover, the sulfur source is not heat-treated, but directly mixed. Therefore, the adhesion between sulfur and the ternary material is poor, and electrical contact tends to be lost subsequently, resulting in electrochemical failure and unsatisfactory energy density. In addition, the morphology of the microparticles of Example 1 to Example 6 can also maintain the compaction density of the material as a whole after the compaction process, which is more conducive to obtaining a considerable energy density.

In the description of this specification, the description of the reference terms such as "an embodiment", and "another embodiment" means that the specific features, structures, materials or characteristics described with reference to the embodiment are included in at least one embodiment or example of the present application. In the present specification, the illustrative expression of the above terms is not necessarily referring to the same embodiment or example. Moreover, the described specific features, structures, materials or characteristics may be combined in any suitable manners in one or more embodiments. In addition, without contradicting each other, those skilled in the art may combine different embodiments or examples and features of the different embodiments or examples described in this specification.

Although the embodiments of the present application have been shown and described above, the above embodiments are exemplary and should not be construed as a limitation on the present application, and a person skilled in the art may make changes, modifications, replacements and variations to the above embodiments within the scope of the present application.

What is claimed is:

1. A cathode material, comprising cathode material particles, wherein each of the cathode material particles comprises a central portion, and a surface layer area, wherein the central portion comprises lithium oxide, the surface layer area comprises lithium oxide and elemental sulfur, and the surface layer area comprises pores filled with the elemental sulfur, wherein:
   an outer surface of each of the cathode material particles is further formed with a coating,
   the coating is formed of titanium dioxide,
   in the cathode material, a weight ratio of the lithium oxide, the elemental sulfur, and the titanium dioxide is (90-45):(5-50):(2-8),
   the lithium oxide comprises $\delta LiNi_mCo_nX_{(1-m-n)}O_2:(1-\delta) Li_2MO_3$,
   $0 \leq \delta \leq 1$, X comprises at least one of Mn, Al, Nb, and Fe, M comprises at least one of Mn, Al, Nb, Fe, Co, and Ni, $0 \leq m < 1$, $0 \leq n < 1$, and $0 \leq m+n < 1$.

2. The cathode material according to claim 1, wherein the cathode material particles have an average particle size of 5-50 μm, and the surface layer area has a thickness of 0.5-20 μm.

3. The cathode material according to claim 1, wherein the cathode material particles are one of a spherical, rhombic, or ellipsoidal shape.

4. The cathode material according to claim 1, wherein based on a total weight of the cathode material particles, content of the elemental sulfur is 5-50 wt %, and content of the lithium oxide is 50-95 wt %.

5. The cathode material according to claim 1, wherein the lithium oxide in the central portion is formed by packing lithium oxide nanoparticles, and the lithium oxide nanoparticles comprise at least one of rod-shaped lithium oxide or bulk lithium oxide.

6. The cathode material according to claim 5, wherein the lithium oxide nanoparticles have a length of 0.5-2 μm, a width of 200-500 nm, and an aspect ratio of 2-40.

7. The cathode material according to claim 1, wherein the coating further comprises at least one of carbon materials, tin dioxide, manganese dioxide, tricobalttetraoxide, vanadium pentoxide, iron disulfide, copper disulfide, cobalt disulfide, or bismuth trisulfide.

8. The cathode material according to claim 1, wherein based on a total weight of the cathode material, content of the coating is 0.1 to 10 wt %.

9. The cathode material according to claim 1, wherein a pore size of the pores is 50-1000 nm.

10. The cathode material according to claim 1, wherein the lithium oxide comprises at least one of a nickel cobalt manganese ternary material, a nickel cobalt aluminum ternary material, or a lithium-rich material.

11. A lithium ion battery, comprising a cathode material, wherein the cathode material comprises cathode material particles, wherein each of the cathode material particles comprises a central portion and a surface layer area, wherein the central portion comprises lithium oxide, the surface layer area comprises lithium oxide and elemental sulfur, and the surface layer area comprises pores filled with the elemental sulfur, wherein:
- an outer surface of each of the cathode material particles is further formed with a coating,
- the coating is formed of titanium dioxide,
- in the cathode material, a weight ratio of the lithium oxide, the elemental sulfur, and the titanium dioxide is (90-45):(5-50):(2-8),
- the lithium oxide comprises $\delta LiNi_m Co_n X_{(1-m-n)} O_2 \cdot (1-\delta) Li_2 MO_3$,
- $0 \leq \delta \leq 1$, X comprises at least one of Mn, Al, Nb, and Fe, M comprises at least one of Mn, Al, Nb, Fe, Co, and Ni, $0 \leq m < 1$, $0 \leq n < 1$, and $0 \leq m+n < 1$.

12. The lithium ion battery according to claim 11, wherein the cathode material particles have an average particle size of 5-50 μm, and the surface layer area has a thickness of 0.5-20 μm.

13. The lithium ion battery according to claim 11, wherein the cathode material particles are one of a spherical, rhombic, or ellipsoidal shape.

14. A method for preparing the cathode material of claim 1, the method comprising:
- mixing a solution containing a metal ion, a complexing agent, and a precipitating agent while stirring, and co-precipitating to obtain a core precursor, mixing the core precursor with a lithium source and baking to obtain cathode material particle precursors formed by packing lithium oxide nanoparticles, wherein each of the cathode material particle precursors comprises a central portion and a surface layer area located outside the central portion, and the surface layer area comprises pores, wherein the metal ion comprises at least one of Mn, Al, Nb, Fe, Co, and Ni, the lithium oxide nanoparticles comprise $\delta LiNi_m Co_n X_{(1-m-n)} O_2 \cdot (1-\delta) Li_2 MO_3$, $0 \leq \delta \leq 1$, X comprises at least one of Mn, Al, Nb, and Fe, M comprises at least one of Mn, Al, Nb, Fe, Co, and Ni, $0 \leq m < 1$, $0 \leq n < 1$, and $0 \leq m+n < 1$;
- mixing the cathode material particle precursors with a sulfur source, performing a melting and solidifying treatment on the cathode material particle precursors with the sulfur source to fill elemental sulfur in the pores of the surface layer area and obtain the cathode material particles; and
- coating each of the cathode material particles with the coating to obtain the cathode material.

15. The method according to claim 14, wherein a length of the lithium oxide nanoparticles is 0.5-2 μm, a width of the lithium oxide nanoparticles is 200-500 nm, and an aspect ratio of the lithium oxide nanoparticles is 2-40.

16. The method according to claim 14, wherein a pore size of the pores is 50-1000 nm.

17. The method according to claim 14, wherein:
- the core precursor is formed at a temperature of 30° C.-60° C., a pH of the solution in the co-precipitating is of 10-12, and a speed of the stirring is of 300-1000 rpm/min, content of the complexing agent is of 5-15 wt % in the solution.

18. The method according to claim 14, wherein the cathode material particle precursors and the sulfur source are mixed at a weight ratio of (8-12):(0.5-2); and the melting and solidification treatment is performed at 120° C.-180° C. for 10-15 hours.

* * * * *

UNITED STATES PATENT AND TRADEMARK OFFICE
CERTIFICATE OF CORRECTION

PATENT NO. : 12,145,859 B2  
APPLICATION NO. : 17/259100  
DATED : November 19, 2024  
INVENTOR(S) : Dongjie Hu and Hao Wei Page 1 of 1

It is certified that error appears in the above-identified patent and that said Letters Patent is hereby corrected as shown below:

In the Specification

In Column 3, Line 51, that reads "Mn, Al, Nb, Fc, Co, and Ni," should read – Mn, Al, Nb, Fe, Co, and Ni, –

In Column 13, Line 67, that reads "(SEM)" should read – (JEOL) –

In the Claims

In Column 16, Line 41, Claim 1, that reads "the lithium oxide comprises $\delta LiNi_mCo_nX_{(1-m-n)}O_2:(1-\delta)$" should read – the lithium oxide comprises $\delta LiNi_mCo_nX_{(1-m-n)}O_2 \cdot (1-\delta)$ –

Signed and Sealed this  
Twenty-seventh Day of May, 2025

Coke Morgan Stewart  
*Acting Director of the United States Patent and Trademark Office*